United States Patent [19]

Bradford et al.

[11] 4,053,564

[45] Oct. 11, 1977

[54] EXTRACTION PROCESS FOR PURIFICATION OF PHOSPHORIC ACID

[75] Inventors: James L. Bradford, Brea; Fernando Ore', Whittier, both of Calif.

[73] Assignee: Occidental Petroleum Company, Los Angeles, Calif.

[21] Appl. No.: 688,265

[22] Filed: May 20, 1976

[51] Int. Cl.$^2$ .............................................. C01B 25/16
[52] U.S. Cl. ................................................ 423/321 S
[58] Field of Search ............... 423/24, 320, 321 R, 423/321 S

[56] References Cited

U.S. PATENT DOCUMENTS

| | | | |
|---|---|---|---|
| 3,367,749 | 2/1968 | Koerner et al. | 423/321 S |
| 3,649,220 | 3/1972 | Powell et al. | 423/321 S |
| 3,694,153 | 9/1972 | Williams et al. | 423/321 S |
| 3,872,209 | 3/1975 | Hazen et al. | 423/24 |
| 3,903,247 | 9/1975 | Blumberg et al. | 423/321 S |
| 3,966,569 | 6/1976 | Reinhardt et al. | 423/24 |
| 3,970,741 | 7/1976 | Pavonet | 423/321 S |

OTHER PUBLICATIONS

Austr. Journ. of Chem., vol. 13, No. 1, 2/60, pp. 58 to 66.
Ind. Eng. Chem. Proc. Des. Dev., vol. 11, No. 1, 1972. pp. 122 to 128.
C. & Eng. News, 9/1/75, p. 22.

Primary Examiner—O. R. Vertiz
Assistant Examiner—Eugene T. Wheelock
Attorney, Agent, or Firm—William G. Lane; Edward A. Grannen, Jr.; Barry A. Bisson

[57] ABSTRACT

Water immiscible organic acid phosphates used in conjunction with water immiscible organic sulfonic acids results in an improved process for the purification of phosphoric acid. An increase in the extraction of ionic metallic impurities and a decrease in the extraction of $P_2O_5$ values from the aqueous phosphoric acid phase is observed in the improved solvent extraction process.

18 Claims, No Drawings

EXTRACTION PROCESS FOR PURIFICATION OF PHOSPHORIC ACID

BACKGROUND

The present invention is directed to a process for the purification of phosphoric acid. A solvent extraction process is employed to remove ionic metallic impurities, such as $Ca^{+2}$, $Mg^{+2}$, $Al^{+3}$ and $Fe^{+2,+3}$, from unpurified phosphoric acid, preferably unpurified wet process phosphoric acid prepared by the dihydrate, the hemihydrate or the anhydrite process. The purified phoshoric acid can then be employed in the production of high quality superphoshoric cid (SPA).

As is known in the art, SPA is produced by conventional techniques of evaporation and/or dehydration of phosphoric acid. The $P_2O_5$ content of the SPA so produced is from a minimum of about 65% $P_2O_5$ to values over 100% $P_2O_5$.

If unpurified phosphoric acid is used in the SPA process, SPA possessing a high viscosity is usually produced. On aging, a plastic-or glass-like material results which is extremely difficult to handle. On the other hand, SPA produced from purified phoshoric acid does not exhibit these deleterious properties.

As shown in "Phosphoric Acid by the Wet Process" by Robert Noyes, Noyes Development Corp., Park Ridge, N.J., 1967, SPA is preferred over phosporic acids containing lesser amounts of $P_2O_5$ such as merchant grade phosphoric acid containing about 54% $P_2O_5$ because:

1. Higher grade liquid fertilizers can be produced from the higher $P_2O_5$ content acid.
2. Higher analysis superphosphates and ammonium phosphates can be produced.
3. SPA carries larger quantities of micronutrients.
4. It's more economical to handle and transport SPA (more pounds of $P_2O_5$ per pound of material handled.)
5. SPA produces a better solid fertilizer.
6. A controlled release fertilizer can be produced from SPA.

A solvent extraction process has been described by Williams et al. U.S. Pat. No. 3,694,153 (hereinafter referred to as Williams) for the purification of wet process phosphoric acid. Using liquid water immiscible organic sulfonic acids dissolved in organic solvents, Williams was able to remove ionic metallic impurities from the phosphoric acid. Using 55% acid, Williams removed 18% of the calcium, 22% of the magnesium and 1% of the $P_2O_5$. When 28% $P_2O_5$ acid was used, approximately 30% of the calcium, 24% of the magnesium and 7% of the $P_2O_5$ were removed from the phosphoric acid.

SUMMARY

The present invention is directed to the purification of phosphoric acid. The present invention is directed to the purification of phosphoric acid by a solvent extraction process using an organic extractant phase comprising a water immiscible organic solvent which contains at least one organic sulfonic acid and at least one organic acid phosphate compound dissolved therein. Substitution of the organic acid phosphate(s) as a phase modifier in place of water immiscible alcohols in the organic extractant phase results in the removal of more impurities such as calcium, magnesium and aluminum from the phosphoric acid while decreasing or depressing the removal of $P_2O_5$ values from the phosphoric acid being purified.

DETAILED DESCRIPTION

Aqueous phosphoric acid is purified by a solvent extraction process. An aqueous phosphoric acid phase containing ionic metallic impurities, selected from the group consisting of calcium, magnesium, aluminum and iron (II) and (III), is purified by thoroughly mixing said aqueous phosphoric acid phase with an organic extractant phase which contains at least one water immiscible organic sulfonic acid and at least one water immiscible organic acid phosphate compound dissolved in a water immiscible organic solvent to extract the ionic metallic impurities therefrom. After mixing, the aqueous phosphoric acid phase is separated from the loaded organic extractant phase which contains ionic metallic impurities selected from the group consisting of calcium, magnesium, aluminum, and iron (II) and (III) and $P_2O_5$ values to yield purified phosphoric acid.

An aqueous phosphoric acid phase containing from 1% $P_2O_5$ to 55% $P_2O_5$ by weight and also containing ionic metallic impurities such as calcium, magnesium, aluminum and iron (II) and (III) can be used in the present invention. This can be wet process phosphoric acid made by the dihydrate, the hemihydrate or the anhydrite process. It can be a dilute (1% to 5% $P_2O_5$ by weight) phosphoric acid solution produced by the acidulation of $P_2O_5$ values in slimes produced in the beneficiation of phosphate rock. Waste phosphoric acid solutions containing metallic impurities such as chromium, zinc, nickel, and the like can also be utilized in the present invention. It is preferable to use an aqueous phosphoric acid prepared by a wet process method.

The organic extractant phase consists of at least one water immiscible organic sulfonic acid and at least on water immiscible organic acid phosphate compound dissolved in a water immiscible organic solvent.

Water immiscible organic sulfonic acids employed in accordance with the practice of this invention includes aryl-, alkylaryl-, polyalkylaryl-, alkanoylaryl-, and polyalkanoylaryl-sulfonic acids.

An especially preferred group of sulfonic acids for the present invention are the substituted sulfonic acids of formulae I and II

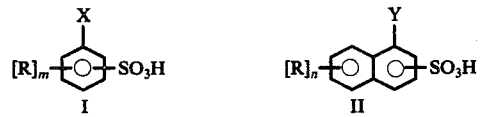

wherein formula I, R is an alkyl group of from 5 to 25 carbon atoms or an alkanoyl group of 8 to 18 carbon atoms, $[R]_m$ contains at least 8 carbon atoms when $m$ is 1 is $[R]_m$ contains at least 10 carbon atoms when $m$ is 2 and further provided that $m$ can be 1 or 2 when R is alkyl and $m$ can be 1 when R is alkanoyl; wherein in Formula II, R is an alkyl group of from 5 to 25 carbon atoms or an alkanoyl group of from 5 to 18 carbon atoms, $[R]_n$ contains at least 8 carbon atoms when $n$ is 1, $[R]_n$ contains at least 10 carbon atoms when $n$ is 2 and $[R]_n$ contains at least 15 carbon atoms when $n$ is 3, further provided that $n$ can be 1, 2, or 3 when R is alkyl and $n$ can be 1 or 2 when R is alkanoyl; X is hydrogen, hydroxy, fluoro, chloro, bromo, iodo, methoxy, ethoxy, propoxy, -carboxymethoxy or -carboxyethoxy; and Y is hydrogen, hydroxy, -carboxymethoxy or -carboxyethoxy; provided, however, that Y is in the alpha position with respect to the —SO₃H group and further provided that the —SO₃H group is at position 1 or 2 on the naphthalene molecule.

The R alkyl or alkanoyl groups can be in a position on the benzene or naphthalene rings and can be on one or both of the naphthalene rings. The R alkyl groups can be straight chain or branched chain groups, preferably branched chain groups.

These compounds are made by known chemical processes, for example; the Friedel-Crafts reaction is used to alkylate the phenol or naphthalene and the Williamson-type ether synthesis is used when an ether linkage is introduced into the molecule.

The water immiscible organic sulfonic acids contain at least 12 carbon atoms and preferably about 14 to about 30. An especially preferred group of water immiscible organic sulfonic acids for the present process are dinonylnaphthalene sulfonic acid, 5-dodecanoyl-2-chlorobenzenesulfonic acid, 5-nonyl-2-ethoxybenzenesulfonic acid, 3,5-di-ti-octyl-2-(alphacarboxymethoxy)-benzenesulfonic acid and 3,5-di-t-octyl-hydroxybenzenesulfonic acid.

Water immiscible organic acid phosphate compounds consititute another component of the organic extractant phase employed in the present process. "Organic acid phosphate" is the general name given to mixtures of mono- and di-organo substituted phosphoric acid compounds corresponding to (RO) PO₃H₂ and (RO)₂PO₂H respectively. Pure organic acid phosphates, either mono- or di- substituted, can also be used. The materials which can be used in this process are mixtures of 0.1% to 60.0% by weight monosubstituted and about 99% to about 35% by weight disubstituted organic acid phosphates which can contain about 0.1% to about 1.0% of the alcohol corresponding to the organic substituent, about 0.1% to about 5.0% triorgano- phosphates and about 0.1% to about 3.0% phosphoric acid and condensed phosphates. A description of organic acid phosphates that are available are described in the "Product Information Bulletin" of Mobil Chemical Corp. titled "Organic Acid Phosphates" six pages, no date of publication, and Technical Data Sheet No. 707 of Hooker Chemical Corp. titled "Alkyl Acid Phosphates" December 1961 and Union Carbide Corp. Product Information Bulletin F-42118, "Di(2-ethylhexyl) Phosphoric Acid." Synthesis conditions and purification procedures can alter the ratio of the monosubstituted to the disubstituted derivatives as described in "Phosphorous And Its Compounds" Vol. II, John R. Van Wazer, editor, Interscience Publishers Inc., 1961. Purification of said mixtures results in organic acid phosphates containing 95%+ of the monosubstituted or the disubstituted derivative.

The formula of the organic acid phosphates employed in accordance with the practice of the present process are shown below as formula III and IV

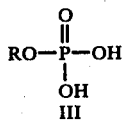
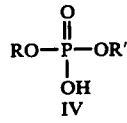

wherein R and/or R' can be alkyl, alkenyl, alicyclic, aryl, alkenylaryl, alkylaryl, alicyclicaryl or heterocyclic groups. The organic substituent groups, that is the R or R' groups, may contain halo, hydroxy, and alkoxygroups. The substituent groups R and R' should contain at least 4 carbon atoms and more preferably from 8 to about 18 carbon atoms. R can be the same or as different than R' preferably R is the same as R'.

Illustrative but nowise limiting are the following examples or organic acid phosphates:

amyl acid phosphate, isooctyl acid phosphate, 2-ethylhexyl acid phosphate, decyl acid phosphate, lauryl acid phosphate, stearyl acid phosphate, phenyl acid phosphate and octylphenyl acid phosphate, cyclohexyl acid phosphate, cyclohexyl phenyl acid phosphate, 1-(5-hexynyl) acid phosphate, 1-(5-hexenyl)-phenyl acid phosphate, 1(6-chlorohexyl) acid phosphate, 1-(6-hydroxyhexyl) acid phosphate and 1-(6-methoxyhexyl) acid phosphate. When aryl-, alkylaryl or alicyclicaryl- acid phosphates are employed, the aromatic ring can be substituted with a hydroxy, an alkoxy or a halo group.

Water immiscible organic phosphonates can also be used in this invention. The half-ester can be used. The formula on the phosphonates are R—P(O) (OH) (OR') in which R and/or R' can be alkyl, alkenyl, alicyclic, aryl, alkenylaryl, alkylaryl, alicyclicaryl or heterocyclic. The organic substituent groups, R and R', may be substituted with an alkoxy, a hydroxy or a halo group; said R groups may be the same or different. R and/or R' should contain from 4 to about 18 carbon atoms.

The water immiscible organic sulfonic acid and the water immiscible organic acid phosphate can be dissolved in water immiscible organic solvents. The preferred solvents are saturated hydrocarbons having a boiling point between 120° and 230° C, flash points between 15° and 80° C and densities lower than the density of the phosphoric acid. Either pure hydrocarbons or mixtures of hydrocarbons may be used.

Illustrative, but nowise limiting, of the water immiscible organic solvent for the water immiscible organic sulfonic acids and the water immiscible organic acid phosphates employed in the present process are kerosene, mineral spirits, benzene, naphtha, xylene, toluene, nitrobenzene, carbon tetrachloride, chloroform, methylene chloride, trichloroethylene, isooctane, heptane and the like.

The water immiscible organic sulfonic acid can be dissolved in the water immiscible organic solvent in concentrations of about 0.05 to about 3.0 molar or more of the water immiscible organic sulfonic acid. The preferred concentration range of the water immiscible organic sulfonic acid in the water immiscible organic solvent is from about 0.2 to bout 0.5 molar.

The water immiscible organic acid phosphate can be dissolved in the water immiscible organic solvent in concentrations of 0.05 to about 1.0 molar or more of the water immiscible organic acid phosphate. The preferred concentration is about 0.15 to about 0.65 molar of the water immiscible organic acid phosphate.

An aqueous phosphoric acid phase containing from about 1% to about 55% P₂O₅ by weight and additionally containing ionic metallic impurities selected from the group consisting of calcium, magnesium, aluminum and iron (II) and (III) is thoroughly mixed with an organic extractant phase. The organic extractant phase contains at least one water immiscible organic sulfonic acid and at least one water immiscible organic acid phosphate dissolved in water immiscible organic solvent.

The temperature of the aqueous phosphoric acid phase can be from about 20° to about 77° C; preferably from about 55° to about 70° C. The organic extractant phase can be from about 20° to about 60° C; preferably from about 50° to about 58° C.

The aqueous phosphoric acid phase at a temperature of from about 55° to about 70° C is thoroughly mixed with the organic extractant phase maintained at a temperature of from about 50° to about 58° C, the temperature of the resulting mixture is about 50° to about 65° C. The volume ratio of the organic extractant phase to the aqueous phosphoric acid phase is from about 1 to 1 to about 50 to 1; preferably from about 2 to 1 to about 12 to 1 and most preferably from about 3 to 1 to about 7 to 1.

The vigorously mixed organic extractant phase and the aqueous phosphoric acid phase are allowed to settle. Separation of the two phases is effected due to the immiscibility of the phases and the differences in the specific gravities of the phases.

The two discrete phases can be separated one from another by decanting, pumping, gravity flow or the like.

The aqueous phosphoric acid phase can be contacted with an organic extractant phase in 1 to 20 or more extraction stages. It has been found that about three extraction stages yield satisfactory results, although more or less stages may also be used.

The separated phosphoric acid can now be concentrated to SPA or it can be used for other purposes.

The separated organic extractant phase (referred to as the loaded organic extractant phase) contains ionic metallic impurities extracted from the aqueous phosphoric acid phase as well as coextracted $P_2O_5$ values. The $P_2O_5$ values can range from about 3 to about 20% of the $P_2O_5$ initially present in the aqueous phosphoric acid phase.

The loaded organic extractant phase containing extracted $P_2O_5$ values and extracted ionic metallic impurities can be processed by vigorously mixing said loaded organic extractant phase in a wash stage with the wash phase. The wash phase comprises water or a dilute phosphoric acid phase which contains from about 10 grams/liter to about 300 grams/liter of $P_2O_5$. The wash phase can be used to selectively remove coextracted $P_2O_5$ values from the loaded organic extractant phase containing said $P_2O_5$ values.

Using only water, an emulsion can result when the wash phase exiting the wash stage contains about 100 grams/liter $P_2O_5$ or less. Emulsions can be controlled by the use of surfactants but some of the surfactant may enter the aqueous phosphoric acid phase as an impurity which is undesirable. The wash phase which contains 100 grams/liter $P_2O_5$ (about 10% $P_2O_5$ by weight) is quite dilute.

Recovery of the $P_2O_5$ values from this dilute solution by precipitation with lime or limestone, for example, is possile but not economically attractive.

Therefore, a wash phase comprising a dilute phosphoric acid phase containing from about 10 grams/liter to about 300 grams/liter; preferably from about 150 grams/liter to about 250 grams/liter, is preferred. Phosphoric acid used to prepare the dilute phosphoric acid phase may be wet process phosphoric acid, reagent grade phosphoric acid or a portion of the wash phase exiting the wash stage. The dilute phosphoric acid phase exiting this wash stage is usually more pure than the purified aqueous phosphoric acid phase due to the selective stripping of $P_2O_5$ values over the metallic impurities.

The water utilized in preparing a wash phase consisting of a dilute phosphoric acid phase may be process water, distilled or deionized water or, hot steam condensate water. Hot steam condensate water is preferred because it maintains the temperature of the wash phase between 20° to about 70° C, preferably from about 55° to about 65° C. The volume ratios of the loaded organic extractant phase to the wash phase are from 1 to 1 to about 100 to 1; preferably from about 2 to 1 to about 10 to 1 and most preferably from about 3 to 1 to about 7 to 1.

After thorough mixing of the wash phase with the loaded organic extractant phase, the wash phase and the selectively stripped loaded organic extractant phase are separated. Separation occurs due to the immiscibility of the two phases and the differences in the specific gravity of the two phases. Separation of one phase from another is effected by decanting, pumping, gravity flow or the like. The separated wash phase, preferably containing from 150 grams/liter to 350 grams/liter $P_2O_5$ (14% to 27% $P_2O_5$ by weight), can be diluted with water to prepare additional wash phase, or it can be added to the aqueous phosphoric acid phase to be returned to the extraction step, or the $P_2O_5$ values may be recovered therefrom in a separate operation by precipitation of the $P_2O_5$ with lime or limestone to form calcium phosphate.

The selectively stripped loaded organic phase separated from the wash phase can be regenerated by treatment with a mineral acid. A mineral acid stripping phase and the selectively stripped loaded organic extractant phase are thoroughly mixed, the temperature of the resulting mixture being about 50° to about 65° C. Separation of the two phases occurs due to immiscibility of the two phases and a difference in specific gravities. Ionic metallic impurities and residual $P_2O_5$ values are stripped from the selectively stripped loaded organic extractant phase into the mineral acid stripping phase. During the regeneration step, the water immiscible organic sulfonic acid and the water immiscible organic acid phosphate are regenerated to their H+ form.

The volume ratios of the selectively stripped loaded organic extractant phase to the mineral acid stripping phase are from 1 to 1 to about 20 or more to 1, preferably 2 to 1 to about 10 to 1.

The selectively stripped loaded organic extractant phase is contacted with the mineral acid stripping phase at least one time, preferably 2 or more times. The number of contacts is dependent upon the case of removal of the ionic metallic impurities from the organic extractant phase.

The mineral acids are inorganic acids which have an ionization constant equal to at least $1 \times 10^{-3}$. The preferred mineral acids are phosphoric, nitric, sulfuric and hydrochloric acid; sulfuric acid being most preferred. The concentration of the phosphoric acid, hydrochloric acid and the nitric acid is from about 2% acid to about 20% acid by weight. The concentration of the sulfuric acid in the mineral acid stripping phase is from about 2% to about 30% $H_2SO_4$ by weight, preferably from 10 to 25% $H_2SO_4$ by weight. At least one stoichiometric equivalent of sulfuric acid to the organic sulfonic acid and the organic acid phosphate is used. The mineral acid stripping phase is maintained at about 20° to about 77° C, preferably from 50° to 71° C. The elevated temperature of the mineral acid stripping phase is achieved by utilizing the heat of dilution of concentrated sulfuric acid with water and by using hot steam condensate as the diluent for the sulfuric acid.

The mineral acid stripping phase removes the extracted ionic metallic impurities and the residual $P_2O_5$ values from the selectively stripped loaded organic extractant phase. The mineral acid stripping phase after separation from the regenerated organic extractant phase contains unused sulfuric acid, phosphoric acid and the sulfate salts of the ionic metallic impurities. When the initial concentration of the sulfuric acid in the mineral acid stripping phase is from 10 to 30% $H_2SO_4$ by weight, considerable amounts of sulfuric acid are present in the waste mineral acid stripping phase. These sulfuric acid values can be utilized by mixing the waste mineral acid stripping phase with fresh mineral acid stripping phase and returning it to the regeneration step. Alternatively, all or a portion of waste mineral acid stripping can be sent to waste disposal where the sulfuric acid in the mineral acid stripping phase is reacted with lime or the like to form gypsum. Optionally, the waste solution can be sent to a recovery plant where the acid and/or metal values are recovered. Preferably, at least a stoichiometric amount of sulfuric acid is used to regenerate the organic sulfonic acid and the organic acid phosphate compound in the organic extractant phase. The regenerated extractant phase can then be recycled and used again.

Rather than selectively recovering $P_2O_4$ values from the loaded organic extractant phase by washing with the wash phase, said loaded organic extractant phase can be contacted directly with the mmineral acid stripping phase to form the regenerated organic extractant phase and the waste mineral acid stripping phase.

The process described above can be used on a batch or a continuous basis.

EXAMPLE 1

The organic extractant phase solutions were prepared by first stripping kerosene solutions containing about 20% by weight of the ammonium salt of dinonylnaphthalenesulfonic acid (DNSA). One hundred and twenty milliliter portions of the DNSA solution were stripped with 4 × 50 ml portions of 2N HCl. The appropriate amount of the DNSA solution was then mixed with the various constituents to prepare the organic extractant solutions as shown in Table 1.

One hundred volumes of each organic extractant phase was thoroughly mixed with 20 volumes of the aqueous phosphoric acid phase for 5 minutes, the analysis of the phosphoric acid is shown in Table 2. The phosphoric acid was prepared by the dihydrate process using Florida phosphate rock and concentrated to 42% $P_2O_5$. The temperature of the phases was 54° C. The two phases were separated; centrifugation was used to separate the entrained aqueous phosphoric acid phase remaining in the loaded extractant phase.

The ionic metallic impurity content and the $P_2O_5$ content of the loaded organic extractant phase were determined in the following manner: An aliquot of the loaded organic extractant phase was stripped twice with equal volumes of 2N HCl; the total volume of HCl used was equal to the volume of the organic aliquot taken for analysis. The ionic metallic impurities were analyzed by means of an atomic absorption spectrophotometer. The $P_2O_5$ (% by weight) was analyzed by the official method of AOAC (Method 12, page 13, 11th Edition, 1960)*. ≠*AOAC Association of Official Analytical Chemists, P.O. Box 340. Benjamin Franklin Station, Washington, D.C. 20044.

The data of Tables 3 and 4 indicate that sample 5, which contains di-(2-ethylhexyl) phosphoric acid extracts 35% more calcium, 37% more magnesium, 28% more aluminum and 38% less $P_2O_5$ when compared to Sample 1, the DNSA-Isodecanol mixture.

EXAMPLE 2

Organic extractant phase composed of DNSA and/or di-(2-ethylhexyl) phosphoric acid (DEHPA) in a kerosene solvent were prepared and the compositions of the samples are shown in Table 5. The DNSA, as in Example 1, was prepared from the ammonium salt of DNSA.

One hundred volumes of the organic extractant phase was thoroughly mixed for 5 minutes with 20 volumes of 42% $P_2O_5$ phosphoric acid prepared by the dihydrate process using Florida phosphate rock. The temperature of the two phases was 54° C. The phases were separated and the loaded organic extractant phase was centrifuged to remove entrained aqueous phosphoric acid phase therefrom.

Tables 5, 6, & 7 show that kerosene solution of DEHPA extracts extremely small amounts of ionic metallic impurities and $P_2O_5$ from the aqueous phosphoric acid phase. However, DEPHA in combination with DNSA does an acceptable job of extracting calcium and magnesium while not extracting large amounts (6% –10% $P_2O_5$) of $P_2O_5$.

The distribution coefficient K($o/a$) is the ratio of the concentration of a given species in the organic phase divided by the concentration of the same species in the aqueous phase in a given test.

Separation factors as used herein as defined as the ratio of the distribution coefficient of a given species, for example MgO, divided by the distribution coefficient for $P_2O_5$ in a given test.

TABLE 1

Sample Constitution % by Weight

| Sample No. | Constituent | DNSA | Constituent | Kerosene |
|---|---|---|---|---|
| 1 | Isodecanol | 19.7 | 6.91 | 73.4 |
| 2 | LIX-63 | 19.5 | 9.41 | 71.0 |
| 3 | Dibutylacetamide | 19.5 | 9.41 | 71.0 |
| 4 | Methylisobutylketone | 19.5 | 9.37 | 71.1 |
| 5 | Di (2-ethylhexyl) phosphoric acid | 19.4 | 11.85 | 68.75 |
| 6 | Tributyl phosphate | 19.5 | 9.37 | 71.1 |

DNSA - Dinonylnaphthalenesulfonic Acid
LIX-63 Trade Mark of General Mills for a hydroxy oxime

TABLE 2

Aqueous Phosphoric Acid Phase Composition

| Constituent | Concentration (grams/liter) |
|---|---|
| $P_2O_5$ | 666 |
| CaO | 0.32 |
| MgO | 3.52 |
| $Al_2O_3$ | 16.87 |
| $Fe_2O_3$ | 14.44 |

TABLE 3

Analytical Results
Aqueous Phosphoric Acid Phase
After Extraction-Concentration (grams/liter)

| Sample | $P_2O_5$ | CaO | MgO | $Al_2O_3$ | $Fe_2O_3$ |
|---|---|---|---|---|---|
| 1 | 600 | 0.15 | 2.20 | 15.02 | 11.87 |
| 2 | 631 | 0.16 | 2.87 | 15.83 | 12.30 |

TABLE 3-continued

Analytical Results
Aqueous Phosphoric Acid Phase
After Extraction-
Concentration (grams/liter)

| Sample | P₂O₅ | CaO | MgO | Al₂O₃ | Fe₂O₃ |
|---|---|---|---|---|---|
| 3 | 572 | 0.31 | 3.50 | 18.73 | 13.87 |
| 4 | 572 | 0.12 | 1.87 | 13.74 | 12.01 |
| 5 | 610 | 0.02 | 1.73 | 13.88 | 11.10 |
| 6 | 590 | 0.04 | 1.72 | 14.10 | 11.71 |

Organic Extractant Phase
After Contacting Phosphoric Acid Phase
Concentration (grams/liter)

| | | | | | |
|---|---|---|---|---|---|
| 1 | 12.1 | 0.04 | 0.26 | 0.40 | 0.16 |
| 2 | 5.15 | 0.03 | 0.14 | 0.12 | 0.05 |
| 3 | 26.7 | 0.01 | 0.04 | 0.14 | 0.16 |
| 4 | 20.5 | 0.04 | 0.32 | 0.71 | 0.34 |
| 5 | 8.91 | 0.05 | 0.36 | 0.52 | 0.06 |
| 6 | 17.4 | 0.05 | 0.35 | 0.68 | 0.34 |

Distribution Coefficients $K(\frac{o}{a})$

| | | | | | |
|---|---|---|---|---|---|
| 1 | 0.0202 | 0.267 | 0.118 | 0.0267 | 0.0135 |
| 2 | 0.0082 | 0.188 | 0.049 | 0.0080 | 0.0040 |
| 3 | 0.0467 | 0.032 | 0.011 | 0.0075 | 0.0115 |
| 4 | 0.0358 | 0.333 | 0.169 | 0.0517 | 0.0283 |
| 5 | 0.0146 | 2.5 | 0.208 | 0.0375 | 0.0054 |
| 6 | 0.0295 | 1.2 | 0.203 | 0.0482 | 0.0290 |

Separation Factors (vs P₂O₅)

| | | | | |
|---|---|---|---|---|
| 1 | 13.2 | 5.84 | 1.32 | 0.67 |
| 2 | 22.9 | 5.97 | 0.97 | 0.49 |
| 3 | 0.69 | 0.24 | 0.16 | 0.25 |
| 4 | 9.30 | 4.72 | 1.44 | 0.79 |
| 5 | 171.2 | 14.2 | 2.57 | 0.37 |
| 6 | 40.7 | 6.88 | 1.63 | 0.98 |

TABLE 4

Aqueous Phosphoric Acid Phase
% Extracted

| Sample | P₂O₅ | CaO | MgO | Al₂O₃ | Fe₂O₃ |
|---|---|---|---|---|---|
| 1 | 9.0 | 56.3 | 36.5 | 11.7 | 5.5 |
| 2 | 3.8 | 46.4 | 19.7 | 3.5 | 1.7 |
| 3 | 19.9 | 15.6 | 5.7 | 4.1 | 5.5 |
| 4 | 14.9 | 60.6 | 44.0 | 20.4 | 11.4 |
| 5 | 6.5 | 76.1 | 49.9 | 15.0 | 2.0 |
| 6 | 12.9 | 72.0 | 49.0 | 19.9 | 11.6 |

MATERIAL BALANCE

| | | | | | |
|---|---|---|---|---|---|
| 1 | 100.9 | 104.1 | 100.3 | 102.5 | 89.3 |
| 2 | 101.4 | 97.9 | 103.7 | 100.2 | 89.5 |
| 3 | 100.7 | 106.5 | 99.2 | 108.5 | 95.8 |
| 4 | 102.5 | 98.9 | 98.3 | 103.5 | 96.3 |
| 5 | 102.7 | 87.7 | 101.4 | 101.4 | 82.8 |
| 6 | 102.3 | 89.7 | 104.3 | 104.3 | 93.5 |

TABLE 5

Organic Extractant Phase Composition
% by weight

| Sample | DNSA | DEHPA | Kerosene |
|---|---|---|---|
| 7 | 15 | 10 | 75 |
| 8 | — | 20 | 80 |
| 9 | 10 | 10 | 80 |

DNSA - Dinonylnaphthalenesulfonic Acid
DEHPA - Di (2-ethylhexyl)-phosphoric Acid

TABLE 6

Analytical Results
Aqueous Phosphoric Acid Phase
Concentration (grams/liter)

| Sample | P₂O₅ | CaO | MgO | Al₂O₃ | Fe₂O₃ |
|---|---|---|---|---|---|
| 7 | 615 | 0.02 | 1.91 | 14.30 | 11.67 |
| 8 | 666 | 0.38 | 3.54 | 18.90 | 13.57 |
| 9 | 634 | 0.07 | 2.44 | 15.51 | 10.71 |

Loaded Organic Extractant Phase
Concentration (grams/liter)

| | | | | | |
|---|---|---|---|---|---|
| 7 | 5.96 | 0.06 | 0.30 | 0.42 | 0.07 |
| 8 | .52 | 0.001 | 0.002 | 0.001 | 0.001 |
| 9 | 3.40 | 0.06 | 0.2 | 0.26 | 0.03 |

Distribution Coefficients $K(\frac{o}{a})$

| | | | | | |
|---|---|---|---|---|---|
| 7 | 0.0097 | 3.0 | 0.157 | 0.0294 | 0.006 |
| 8 | 0.0008 | 0.003 | 0.0006 | 0.0001 | 0.0001 |

TABLE 6-continued

Analytical Results
Aqueous Phosphoric Acid Phase
Concentration (grams/liter)

| Sample | P₂O₅ | CaO | MgO | Al₂O₃ | Fe₂O₃ |
|---|---|---|---|---|---|
| 9 | 0.0054 | 0.857 | 0.0861 | 0.0168 | 0.0112 |

TABLE 7

Aqueous Phosphoric Acid Phase
% Extracted

| Sample | P₂O₅ | CaO | MgO | Al₂O₃ | Fe₂O₃ |
|---|---|---|---|---|---|
| 1 | 9.0 | 56.3 | 36.5 | 11.7 | 5.5 |
| 7 | 4.4 | 91.9 | 41.8 | 12.2 | 2.4 |
| 8 | 0.4 | 1.3 | .3 | 0.03 | 0.03 |
| 9 | 2.5 | 80.5 | 29.3 | 7.5 | 1.3 |

Material Balance

| | | | | | |
|---|---|---|---|---|---|
| 7 | 99.1 | 98.3 | 97.5 | 99.1 | 85.2 |
| 8 | 99.9 | 119.6 | 100.3 | 111.5 | 93.5 |
| 9 | 99.6 | 102.7 | 100 | 101.3 | 76.6 |

What is claimed is:

1. A process for the purification of phosphoric acid which comprises:

a contacting an aqueous phosphoric acid phase containing from 1% to about 55% P₂O₅ by weight and dissolved ionic metallic impurities selected from the group consisting of calcium, magnesium, aluminum and iron (II and III) with an organic extractant phase comprising a water immiscible organic solent containing at least one water immiscible organic sulfonic acid having at least 12 carbon atoms and at least one water immiscible mono- or di-substituted organic acid phosphate, phosphonate, or half-ester thereof dissolved therein to form:

i. a purified phosphoric acid phase; and
ii. a loaded organic extractant phase containing ionic metallic impurities extracted from said aqueous phosphoric acid and selected from the group consisting of calcium, magnesium, aluminum and iron (II and III) and P₂O₅ values, and b. separating the loaded organic extractant phase from the purified aqueous phosphoric acid phase.

2. The process according to claim 1 further comprising: contacting the loaded organic extractant phase separated from the purified phosphoric acid phase of (b) with a wash phase selected from the group consisting of water and a phosphoric acid phase containting from about 10 to about 300 grams per liter of P₂O₅ to selectively strip the P₂O₅ values from the loaded organic extractant phase to form:

i. a selectively stripped loaded organic extractant phase containing residual ionic metallic impurities selected from the group consisting of calcium, magnesium, aluminum and iron (II and III), and residual P₂O₅ values; and
ii. an enriched wash phase containing ionic metallic impurities selected from the group consisting of calcium, magnesium, aluminum and iron (II and III) and P₂O ₅ values stripped from the loaded organic extractant phase;

separating the selectively stripped loaded organic extractant phase from the enriched wash phase;
contacting the selectively stripped loaded organic extractant phase with a mineral acid stripping phase, the mineral acid is an inorganic acid which has an ionization constant of 10⁻³ or larger, to form:

i. a regenerated organic extracted phase comprising a water immiscible organic solvent containing at least one water immiscible organic sulfonic acid in its H+ form and at least one water immiscible organic acid phosphate compound in its H+ form; and ii. a waste mineral acid stripping phase comprising unused mineral acid, residual P₂O₅ values and mineral acid salts of ionic metallic impurities selected from the group consisting of calcium, magnesium, aluminum, and iron (II and III); and separating the regenerated organic extractant phase from the waste mineral acid stripping phase.

3. The process according to claim 2 in which the wash phase is maintained at a temperature of from bout 20° to about 70° C; the loaded organic extractant phase is contracted with the wash phase in a volumetric ratio of from 1 to 1 to about 100 to 1; the temperature of the mineral acid stripping phase is from about 20° to about 77° C and the selectively stripped loaded organic extractant phase is contacted with the mineral acid stripping phase in a volumetric ratio of from 1 to 1 to about 20 or more to 1.

4. The process according to claim 2 in which the mineral acid is selected from the group consisting of nitric, phosphoric, hydrochloric, and sulfuric acid.

5. The process accordng to claim 2 in which the phosphoric acid purification process is run on a continuous basis and the regenerated organic extractant phase is recycled to comprise the organic extractant phase in said step (a).

6. The process according to claim 1 in which the aqueous phosphoric acid phase is at a temperature of from about 20° to about 77° C and the organic extractant phase is at a temperature of from about 20° to about 60° C; said phase are mixed in the volumetric ratio of the organic extractant phase to the aqueous phosphoric acid phase of from 1 to 1 to about 50 to 1.

7. The process according to claim 1 further comprising: contacting the loaded organic extractant phase with a mineral acid stripping phase, the mineral acid billing an inorganic acid which has an ionization constant of 10⁻³ or larger, to form:

i. a regenerated organic extractant phase, and;

ii. a waste mineral acid stripping phase comprising unused mineral acid, P₂O₅ values extracted from the loaded organic extractant phase and mineral acid salts of the ionic metallic impurities consisting of calcium, magnesium, aluminum and iron (II & III) extracted from the loaded organic extractant phase; and separating the regenerated organic extractant phase from the waste mineral acid stripping phase.

8. The process according to claim 7 in which the process for purification of phosphoric acid is run on a continuous basis and the regenerated organic extractant phase is recycled to comprise the organic extractant phase in said step (a).

9. The process according to claim 1 in which the water immiscible organic sulfonic acid is selected from the group consisting of alklaryl, polyalklaryl, alkanoylaryl, polyalkanoylaryl, and aromatic ring substituted sulfonic acid derivatives thereof having the formulaI (I) and (II)

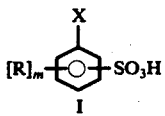
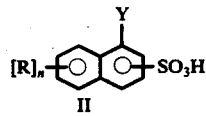

wherein in formula I R is an alkyl group of from 5 to 25 carbon atoms or an alkanoyl group of 8 to 18 carbon $_m$ contains at least 8 carbon atoms when $m$ is 1 and $_m$ contains at least 10 carbon atoms when $m$ is 2 and further provided that $m$ can be 1 or 2 when R is alkyl and $m$ can be 1 when R is alkanoyl; wherein in formula II R is an alkyl group of 5 to 25 carbon atoms or an alkanoyl group of from 5 to 18 carbon atoms, $[R]_n$ contains at least 8 carbon atoms when $n$ is 1, $[R]_n$ contains at least 10 carbon atoms when $n$ is 2 and $[R]_n$ contains at least 15 carbon atoms when $n$ is 3, further provided that $n$ can be 1, 2, 3 when R is alkyl and $n$ can be 1 or 2 when R is alkanoyl; X is hydrogen, hydroxy, fluoro, chloro, bromo, iodo, methoxy, ethoxy, propoxy, carboxymethoxy, or carboxyethoxy; and Y is hydrogen, fluoro, chloro, bromo, iodo, methoxy, ethoxy, 2-propoxy, carboxymethoxy, or carboxyethoxy; provided however, that Y is in the alpha position with respect to the SO₃H group and further provided that the SO₃H group is at position 1 or 2 on the napthalene molecule.

10. The process according to claim 9 in which the water immiscible organic sulfonic acid is selected from the group consisting of dinonylnapthalenesulfonic acid, 5-dodecanoyl-2-chlorobenzenesulfonic acid, 5-nonyl-2-ethoxybenzenesulfonic acid, 3,5-di-t-octyl-2-(alphacarboxymethoxy)-benzenesulfonic acid and 3,5-di-t-octyl-2-hydroxybenzenesulfonic acid.

11. The process according to claim 1 in which the water immiscible organic acid phosphate compound is selected from the group consisting of monosubstituted organic acid phosphates, disubstituted organic acid phosphates, and mixtures thereof in which the substitutent group contains from about 4 to about 18 carbon atoms and is selected from the group consisting of alkyl, alkenyl, alicyclic, aryl, alkylaryl, alkenylaryl, alicyclicaryl, heterocyclic and mixtures thereof.

12. The process according to claim 11 in which the water immiscible organic acid phosphate compounds are selected from the group consisting of 2-ethylhexyl acid phosphate, isooctyl acid phosphate, octylphenyl acid phosphate, amyl acid phosphate, lauryl acid phosphate, oleyl acid phosphate, stearyl acid phosphate, cyclohexyl acid phosphate, 1-(5-hexenyl) acid phosphate, 1-(5-hexenyl) phenyl acid phosphate, cyclohexylphenyl acid phosphate and phenyl acid phosphate.

13. The process according to claim 1 in which the water immiscible organic acid phosphate compound comprises from about 0.1to about 60.% by weight of a monosubstituted acid phosphate, from about 99 to about 35% by weight of a disubstituted organic acid phosphate, from about 0.1 to about 1.0% by weight of the alcohol corresponding to the organic substituent, about 0.1 to about 5.0% by weight of the trisubstituted organic acid phosphate, and residual amounts from about 0.1 to about 3.0% by weight of orthophosphoric acid and condensed phosphoric acid compounds.

14. The process according to claim 1 in which the concentration of the water immiscible organic sulfonic acid is from about 0.05 to about 3.0 molar and the concentration of the organic acid phosphate compound is from about 0.05 to about 1.0 molar.

15. The process according to claim 1 in which the water immiscible organic solvent for the water immiscible organic sulfonic acids and the water immiscible organic acid phosphates is selected from a group consisting of a saturated hydrocarbon and mixtures of saturated hydrocarbons having a boiling point between 120° and 230° C, flash points between 15° and 80° C and densities lower than the density of phosphoric acid.

16. The process according to claim 1 in which the water immiscible organic solvent for the water immiscible organic sulfonic acid and the water immiscible organic acid phosphate is selected from the group consisting of kerosene, mineral spirits, benzene, naphtha, xylene, toluene, nitrobenzene, carbon tetrachloride, chloroform, methylene chloride, trichloroethylene, isooctane and heptane.

17. A process for the purification of phosphoric acid which comprises:
  a. contacting an aqueous phosphoric acid phase containing from 1% to about 55% $P_2O_5$ by weight and dissolved ionic metallic impurities selected from the group consisting of calcium, magnesium, aluminum and iron (II and III) with an organic extractant phase comprising a water immiscible organic solvent containing at least one water immiscible organic sulfonic acid having at least 12 carbon atoms and at least one water immiscible mono- or di-substituted organic acid phosphate compound dissolved therein to form:
    i. a purified phosphoric acid phase; and
    ii. a loaded organic extractant phase containing ionic metallic impurites extracted from said aqueous phosphoric acid phase and selected from the group consisting of calcium, magnesium, aluminum and iron (II and III) and $P_2O_5$ values;
  b. separating the loaded organic extractant phase from the purified aqueous phosphoric acid phase;
  c. contacting the loaded organic extractant phase separated from the purified phosphoric phase of (b) with a wash phase selected from the group consisting of water and a phosphoric acid phase containing from about 10 to about 300 grams per liter of $P_2O_5$ to selectively strip the $P_2O_5$ values from the loaded organic extractant phase to form:
    i. a selectively stripped loaded organic extractant phase containing residual ionic metallic impurities selected from the group consisting of calcium, magnesium, aluminum, and iron (II and III) and residual $P_2O_5$ values; and
    ii. an enriched wash phase containing ionic metallic impurities selected from the group consisting of calcium, magnesium, aluminum, and iron (II and III) and $P_2O_5$ values stripped from the loaded organic extractant phase;
  d. separating the selectively stripped loaded organic extractant phase from the enriched wash phase;
  e. contacting the selectively stripped loaded organic extractant phase with a mineral acid stripping phase, the mineral acid being an inorganic acid which has a ionization constant at $10^{-3}$ or larger, to form:
    i. a regenerated organic extractant phase comprising a water immiscible organic solvent containing at least one water immiscible organic sulfonic acid in its H+ form and at least one water immiscible organic acid phosphate compound in its $H^+$ form; and
    ii. a waste mineral acid stripping phase comprising unused mineral acid, residual $P_2O_5$ values and mineral acid salts of ionic metallic impurities selected from the group consisting of calcium, magnesium, aluminum, and iron (II and III); and
  f. separating the regenerated organic extractant phase from the waste mineral acid stripping phase.

18. A process for the purification of phosphoric acid which comprises:
  a. contacting an aqueous phosphoric acid phase maintained at about 20° to about 77° C and containing from 1 to about 55% $P_2O_5$ by weight and dissolved ionic metallic impurities selected from the group consisting of calcium, magnesium, aluminum and iron with an organic extractant phase comprising a water immiscible organic solvent containing at least one water immiscible organic sulfonic acid having at least 12 carbon atoms and at least one water immiscile mono- or di-substituted organic acid phosphate compound dissolved therein, the temperature of said organic extractant phase being from about 20° to about 60° C, in a volumetric ratio of the organic extractant phase to the aqueous phosphoric acid phase of 1 to 1 to about 50 to 1 to form:
    i. a purified phosphoric acid phase; and
    ii. a loaded organic extractant phase containing ionic metallic impurities extracted from said aqueous phosphoric acid and selected from the group consisting of calcium, magnesium, aluminum, and iron (II) and (III) and $P_2O_5$ values;
  b. separating the loaded organic extractant phase from the purified aqueous phosphoric acid phase;
  c. contacting the loaded organic extractant phase separated from the purified phosphoric acid phase of (b) with a wash phase selected from the group consisting of water and a phosphoric acid phase containin from about 10 to about 300 grams per liter of $P_2O_5$ to selectively strip the $P_2O_5$ values from the loaded organic extractant phase; the loaded organic extractant phase being contacted with the wash phase in the volumetric ratio of from 1 to 1 to about 100 to 1; the temperature of the wash phase being from about 20° to about 70° C, to form:
    i. a selectively stripped loaded organic extractant phase containing residual ionic metallic impurities selected from the group consisting of calcium, magnesium, aluminum, and iron (III), and residual $P_2O_5$ values; and
    ii. a wash phase containin ionic metallic impurities selected from the group consisting of calcium, magnesium, aluminum and iron (II) and (III) and $P_2O_5$ values stripped from the loaded organic extracted phase;
  d. separating the selectively stripped loaded organic extractant phase from the enriched wash phase;
  e. contacting the selectively stripped loaded organic extractant phase with a mineral acid stripping phase, the mineral acid being an inorganic acid which has an ionization constant of $10^{-3}$ or larger, in a volumetric ratio of from 1 to 1 to about 20 or more to 1, the temperature of the mineral acid stripping phase being from about 20° to about 77° C, to form:
    i. a regenerated organic extractant phase comprising a water immiscible organic solvent containing at least one water immiscible organic sulfonic acid in is H+ form and at least one water immiscible organic acid phosphate compound in its H+ form; and
    ii. a waste mineral acid stripping phase comprising unused mineral acid, residual $P_2O_5$ values and mineral acid salts of ionic metallic impurities consisting of calcium, magnesium, aluminum and iron (II) and (III); and
  f. separating the regenerated organic extractant phase from the waste mineral acid stripping phase.

* * * * *